Patented July 12, 1949

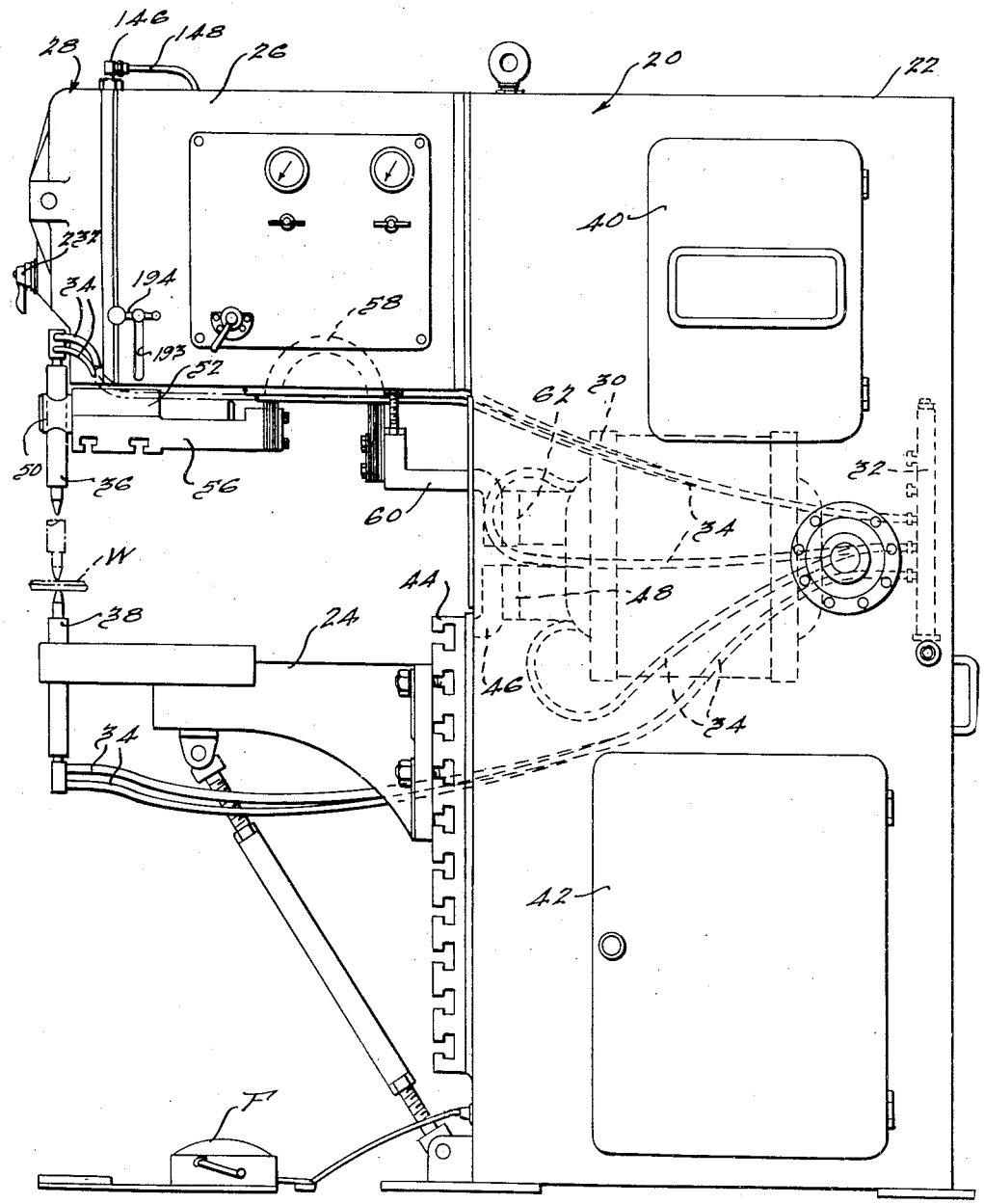

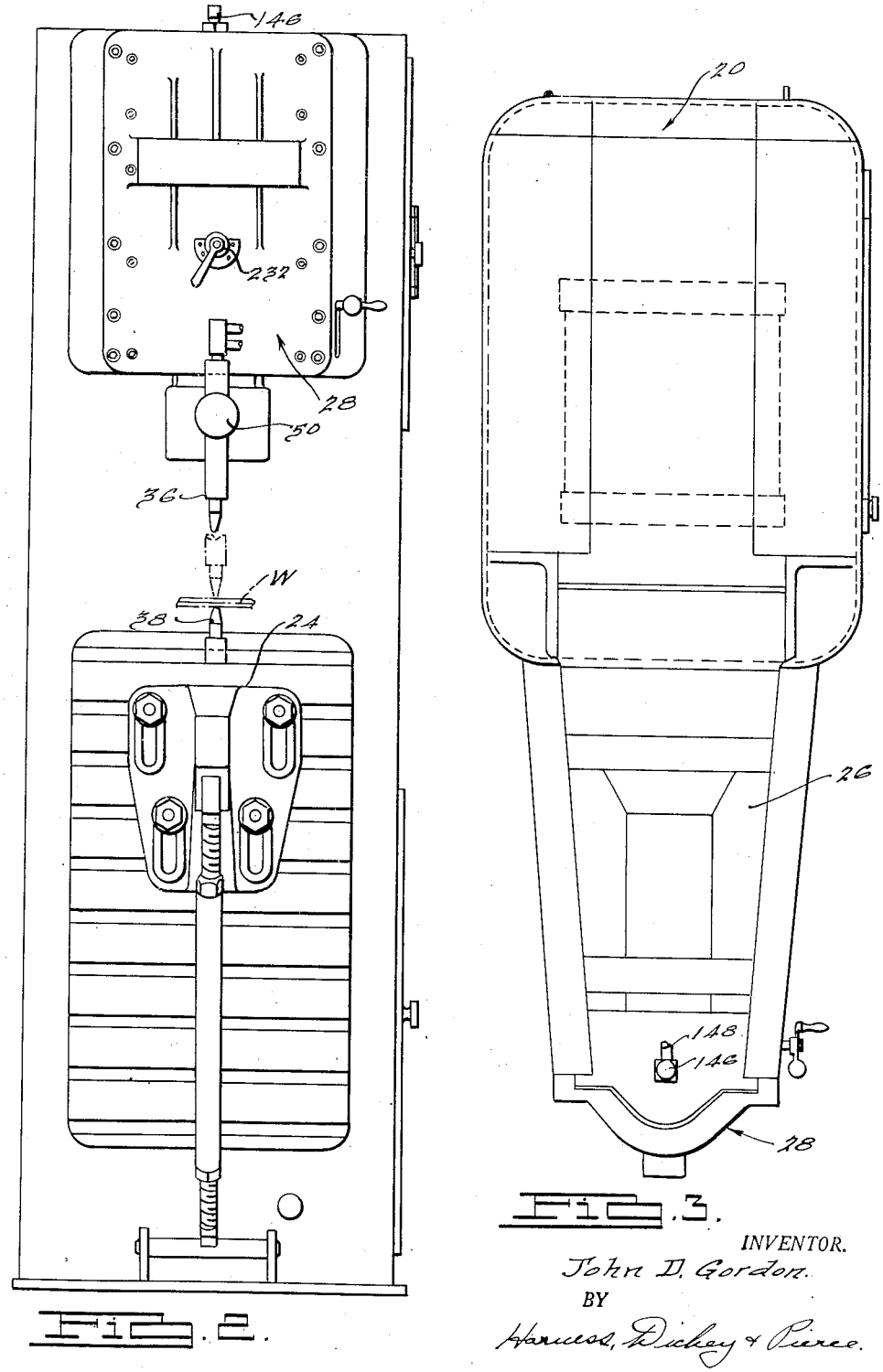

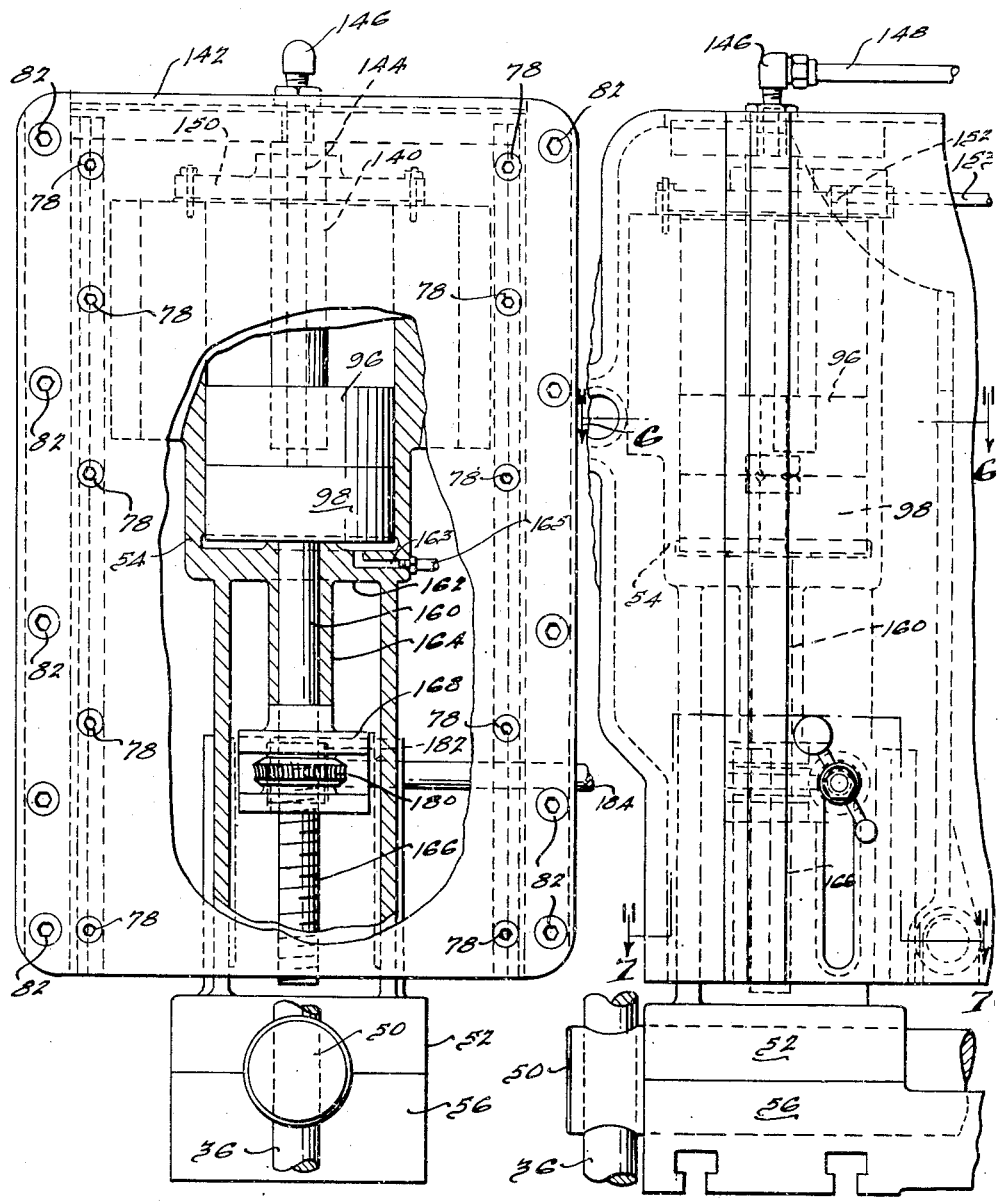

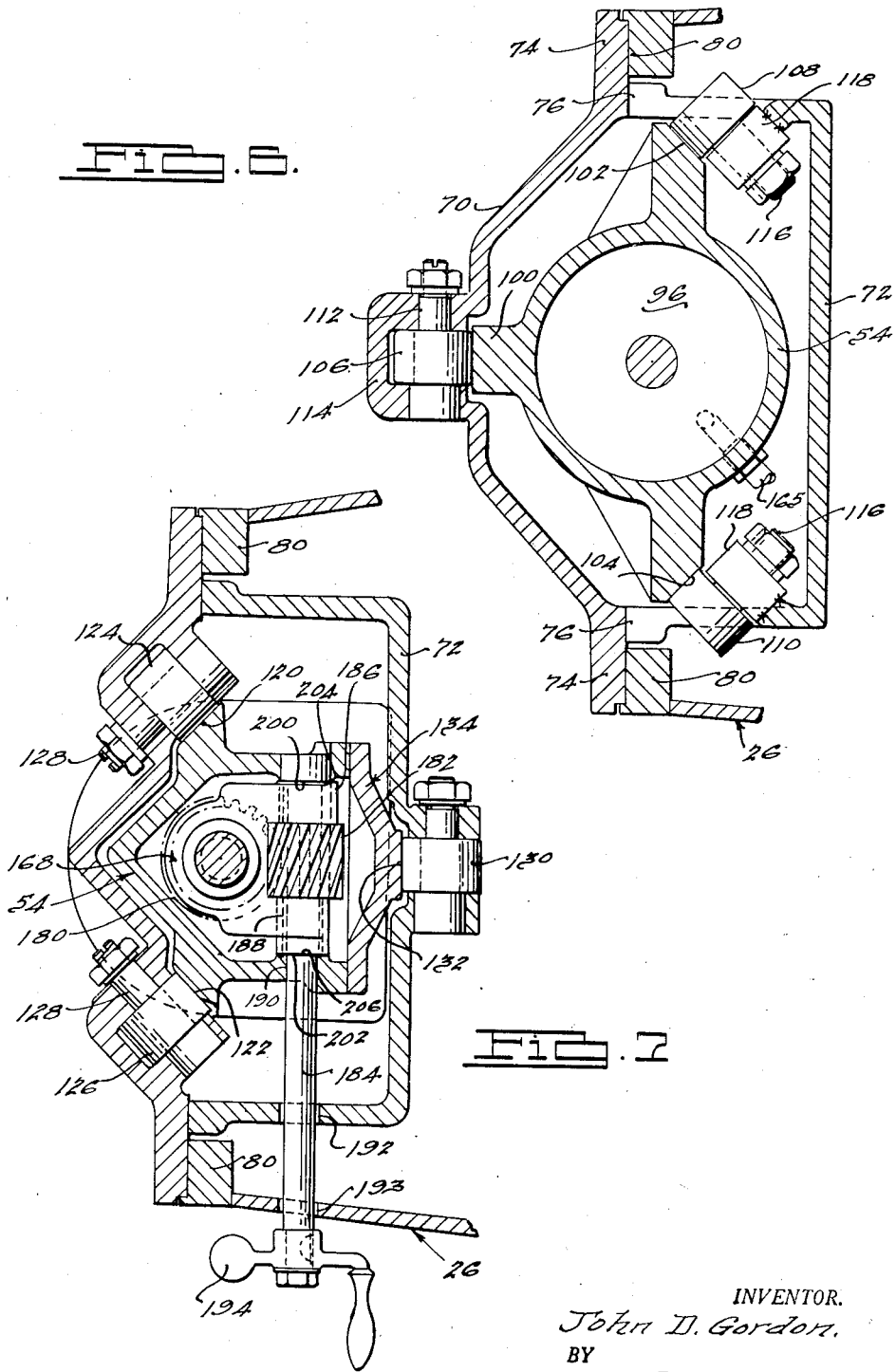

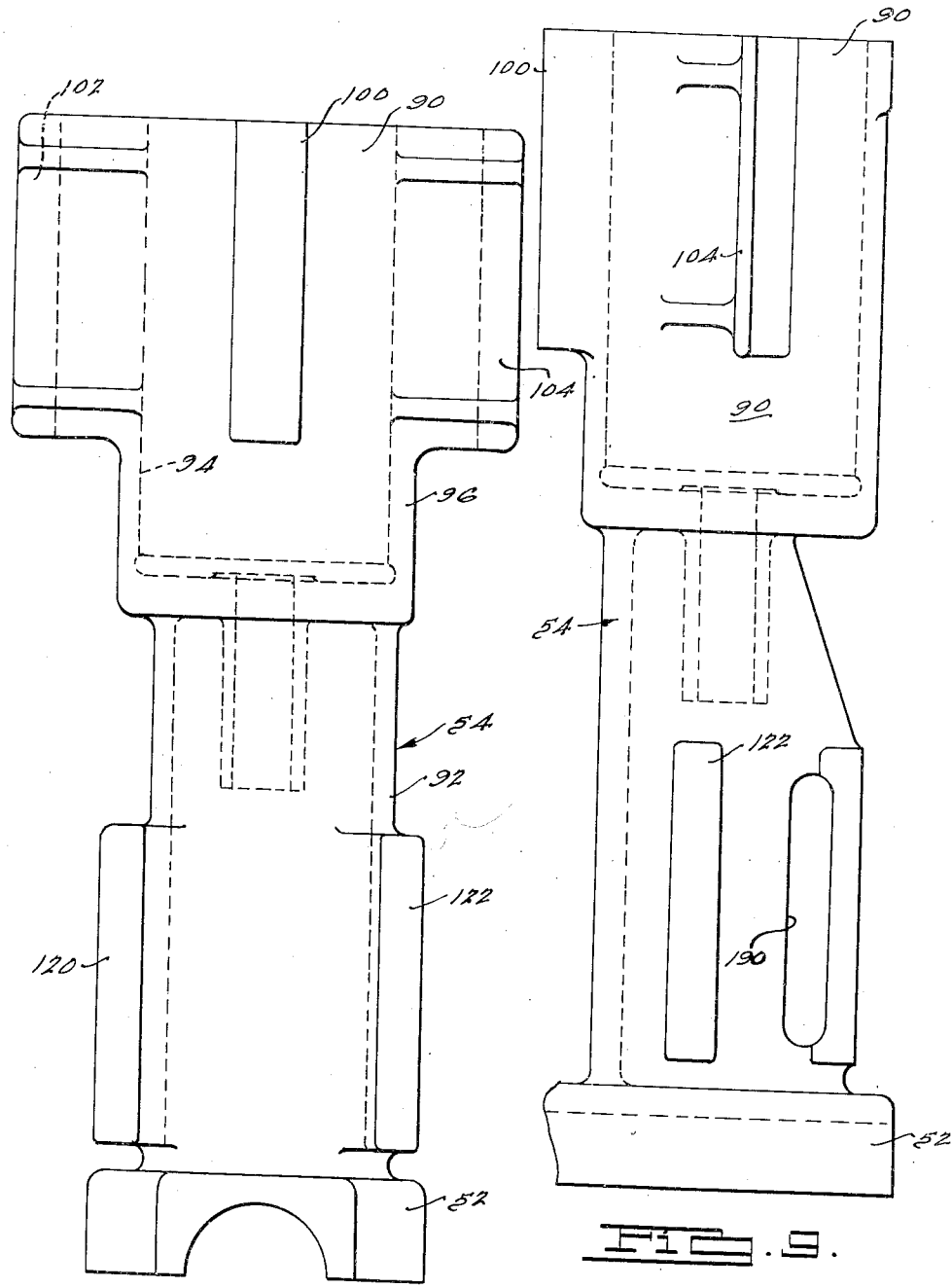

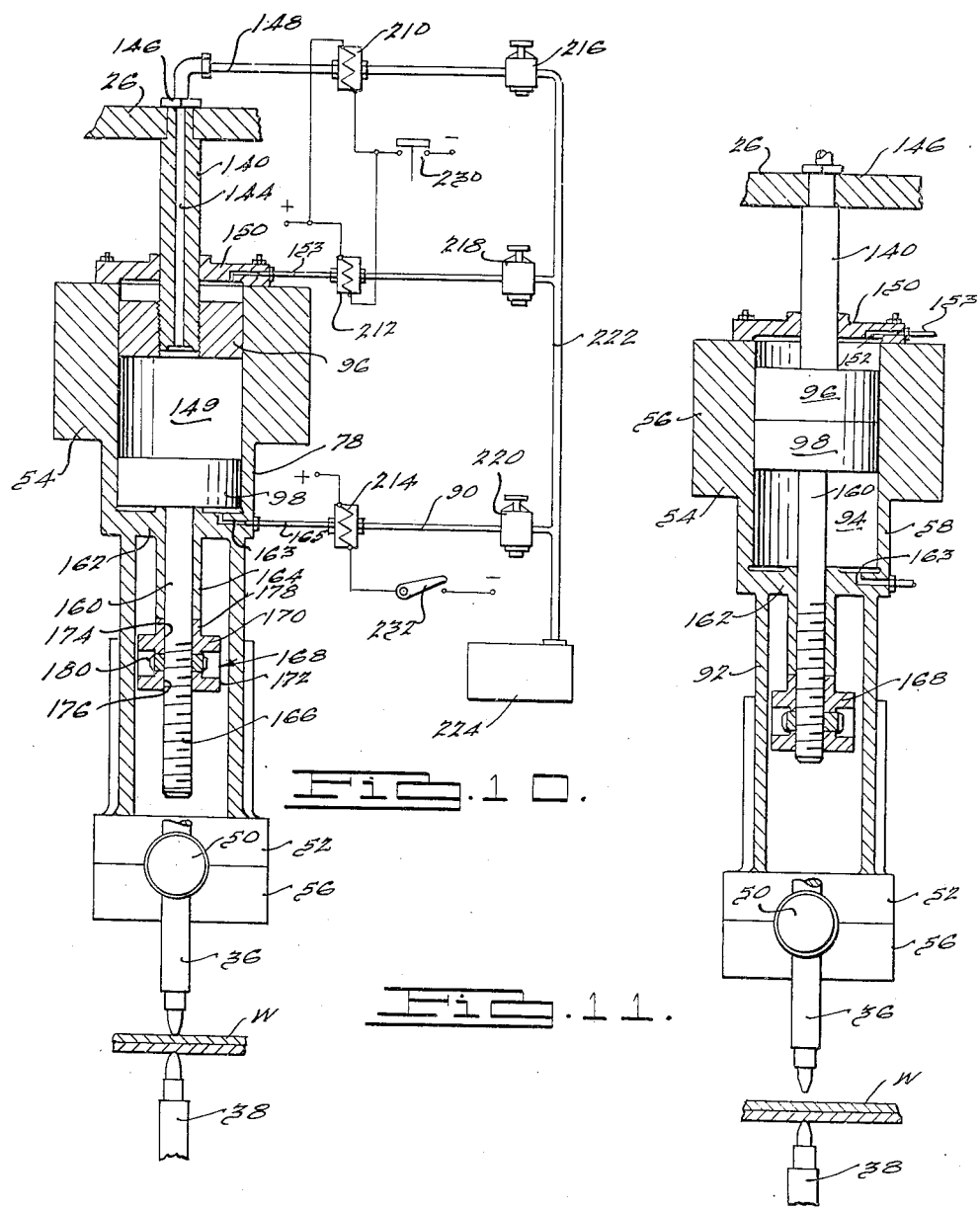

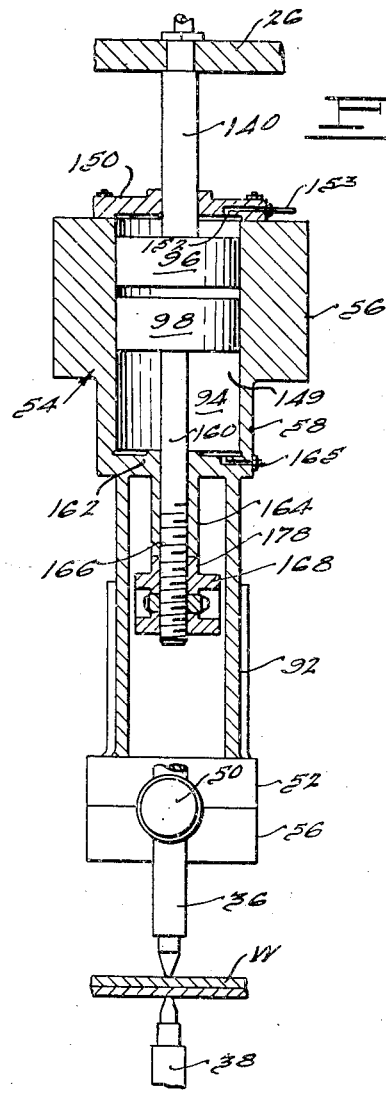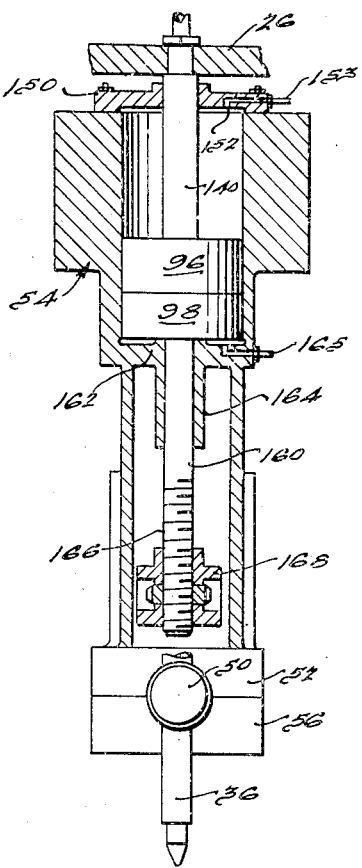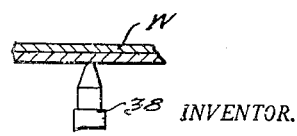

2,476,187

UNITED STATES PATENT OFFICE 2,476,187

WELDING MECHANISM

John D. Gordon, Pleasant Ridge, Mich., assignor to Progressive Welder Company, Detroit, Mich., a corporation of Michigan Application February 27, 1946, Serial No. 650,670

8 Claims. (Cl. 219—4)

The present invention relates to electric heating apparatus and more particularly provides an improved construction for resistance welding machines.

Principal objects of the present invention are to provide apparatus of the above generally indicated character which is simple in arrangement, economical of manufacture and assembly, and reliable and efficient in operation; to provide such apparatus embodying one or more movable heads, of improved construction, each adapted to carry an electrode or other work-engaging heating element; to provide such construction wherein each such movable head is mounted for reciprocating movement, between work-engaging and retracted positions, in an improved roller-bearing assembly; to provide such constructions wherein such roller-bearing assembly includes a plurality of bearing units which are spaced apart in the direction of head movement, each such unit providing a three-point support for the head; to provide such construction wherein each head incorporates improved means for providing a normal working stroke of adjustable length and a longer retracting stroke; to provide such constructions wherein each head incorporates a ram, the cylinder whereof is provided with the aforementioned bearing support and which cylinder is provided with a pair of pistons, one whereof is fixed to the frame and the adjustment of the other whereof relative to the ram cylinder determines the length of the normal working stroke, the length of the retracting stroke being determined primarily by the position of the other piston with respect to the machine frame; and to generally improve and simplify the construction and arrangement of apparatus of the above generally indicated character.

With the above as well as other and more detailed objects in view, which will appear in the following description and in the appended claims, a preferred but illustrative embodiment of the invention is shown in the accompanying drawings, corresponding reference characters being used throughout the several views to designate corresponding parts and in which:

Fig. 1 is a view in side elevation of a resistance welding machine embodying the invention;

Fig. 2 is a view in front elevation of the machine of Fig. 1;

Fig. 3 is a top plan view of the machine of Fig. 1;

Fig. 4 is an enlarged view in front elevation with certain of the parts broken away and certain other of the parts in section, of the upper or movable head assembly of the machine of Fig. 1;

Fig. 5 is a view in side elevation of the structure shown in Fig. 4;

Fig. 6 is a view taken along the line 6—6 of Fig. 5;

Fig. 7 is a view taken along the line 7—7 of Fig. 5;

Figs. 8 and 9 are respectively views in front and side elevation of the ram cylinder which is employed in the present embodiment;

Fig. 10 is a diagrammatic view of air circuits which may be used in connection with the present machine;

Figs. 11, 12, and 13 are views in central vertical section illustrating the position of the movable heads during welding and at the end of the shorter working stroke and at the end of the longer retracting stroke.

It will be appreciated from a complete understanding of the present invention that the improvements thereof may be embodied in various different constructions adapted for various different applications. Preferred embodiments of the invention are in connection with the resistance welding machines adapted for spot, projection, seam, and other resistance welding operations. In an illustrative, but not in a limiting sense, the invention is so disclosed herein.

Referring to the drawings, the illustrated resistance welding machine comprises a main frame 20 having a vertically disposed, elongated, generally rectangular body portion 22, an adjustable lower horn 24, and an upper horn 26, which carries the present improved head 28. In accordance with conventional practice, the frame body 22 may house the usual welding transformer 30 and a coolant manifold 32 from which conduits 34 may extend and serve to provide coolant circuits for the transformer 30 and for the upper and lower welding electrodes 36 and 38. The frame body 22 may also house additional apparatus associated with the operation of the machine, such as the air storage tank, the welding timer, and the like, access to the interior of the frame being afforded, in the illustrated instance, by upper and lower doors 40 and 42.

In the illustrated embodiment the lower electrode 38 is held by the lower horn 24, which is adjustably fixed in position. More particularly, electrode 38 is adjustably secured at the outer end of the horn 24 which in turn is adjustably secured to a conductive supporting pad 44 which is directly secured to but insulated from the frame 22. Pad 44 is electrically connected through a bus bar 46 to one terminal 48 of the secondary winding of the welding transformer 30 and consequently, in conjunction with the conductive horn 24, serves to electrically connect the electrode 38 to such transformer terminal.

The upper electrode 36 is adjustably secured to the outer end of a cylindrical supporting arm 50 which is clamped in place between the lower end 52 of the hereinafter described ram cylinder 54 and an adapter bracket 56 which may be bolted or otherwise secured to member 52. At its inner end bracket 56 is secured to a flexible bus bar 58 which in turn is connected through a rigid bus bar section 60 to the other terminal 62 of the welding transformer 30 so that welding potential may be supplied by the transformer 30 to the electrodes 36 and 38.

The upper head 28, which is bodily removable from the forwardly extending upper horn 26, comprises generally a two-part shell or housing, and the previously mentioned electrode controlling ram, the cylinder whereof is designated 54. The front and rear housing or shell sections 70 and 72 of the head 28 are both of generally channel-shaped form. The outer section 70 is provided with outwardly turned, vertically disposed flanges 74, and vertically disposed marginal edges 76 of the inner housing section 72 abut the inner faces of the flanges. Laterally spaced, vertically arranged rows of studs 78, which may be Allen head cap screws with their heads received in countersinks, serve to releasably secure sections 70 and 72 together. The flanges 74 of the outer section 70 also overlie vertically disposed, laterally spaced supporting surfaces 80 provided along and suitably secured to the vertically disposed face of the upper horn 26. Two rows of laterally spaced, vertically arranged studs 82 which, like studs 78, may be Allen head cap screws with the heads received in countersinks serve to releasably secure the housing sections 70—72 to the horn 26, studs 82 being passed through the flanges 74 into the supporting ways 80.

The ram cylinder 54, which is shown separately in Figs. 8 and 9 and in central vertical section in Figs. 11, 12, and 13, has a somewhat enlarged, generally cylindrical upper portion 56 and a reduced lower section 58 which, in section, is of generally U-shaped form. The upper portion 56 is bored to define a cylindrical cylinder well 94 which slidably receives the hereinafter described upper or fixed piston 96 and a co-operating lower piston 98. The lower section 92 terminates in the previously identified adapting bracket 52 which receives the electrode supporting arm 50.

The upper cylinder section 90 is provided with a series of three circumferentially spaced, radially projecting bearing surfaces 100, 102, and 104 which co-operate with a corresponding series of bearing rollers 106, 108, and 110 (Fig. 6). The front bearing roller 106 is rotatably carried on a trunnion 112 which is received in a boss 114 projecting forwardly from the outer surface of the front housing section 70. Rollers 108 and 110, on the other hand, are carried by trunnions 116 which are rotatably supported in brackets 118 which are rigidly but adjustably secured to the rear housing section 72. It will be noted that the three rollers 106, 108, and 110 co-operate to provide a three-point support for the upper end of the ram cylinder 54.

The lower section 92 of the ram cylinder 54 is provided with a pair of laterally spaced bearing surfaces 120 and 122 which co-operate with corresponding rollers 124 and 126 which are carried by trunnions 128. Trunnions 128 in turn are supported in the front wall of the front housing section 70. In substantially the same plane as the rollers 124 and 126, the rear housing section 72 is provided with an additional bearing roller 130 which co-operates with a bearing surface 132 provided on a cover plate 134 which is removably but rigidly secured to the rear face of the lower cylinder portion 92. Thus rollers 124, 126, and 130 provide a three-point bearing support for the lower end of the ram cylinder 54. The surfaces 100, 102, and 104, as well as the surfaces 120, 122, and 132, are so arranged about the cylinder 54 that, if extended, each set would define a three-sided prism. It is obvious that, if desired, a greater number of surfaces could be used and, if extended to intersect, would form prisms of a larger number of sides.

By inspection of Fig. 1 it will be noted that when pressure is applied between the welding points 36 and 38, the ram cylinder 54 is subjected to vertical loads and is also subjected to transverse or radial loads which tend to force the lower end thereof toward the front of the machine and tend to force the upper end thereof toward the rear of the machine. These transverse loads are well handled by the present bearing assembly, since the lower bearing unit comprises two rollers 124 and 126 at the front side of the ram cylinders, and the upper bearing unit includes two rollers 108 and 110 at the back side of the ram cylinder. It will be recognized, of course, that with this relation, ram cylinder 54 is very accurately guided for up-and-down movement, is supported to withstand substantial forces which act transversely to its axis, and that it can be moved upwardly or downwardly in its housings 70—72 with very little effort. The latter feature is of particular importance in enabling the ram, and consequently the upper electrode 36, to maintain proper pressure on the workpieces W as the latter soften during the heating action. If desired the individual rollers may each be mounted on antifriction bearings to further decrease the effort required to move the housings 70—72.

The previously-mentioned upper piston 96 is rigidly fixed to the lower end of a piston rod 140 which, at its upper end, is rigidly secured to the top 142 of the horn 26. Piston rod 140 is provided with a passageway 144 (Fig. 10) which opens through the lower face of piston 96 and which is connected at its upper end to a fitting 146 to which a usual air supply line 148 may be connected. Passageway 144 thus affords a circuit for admitting air to the cylinder well 149 within the ram cylinder 54, between fixed upper piston 96 and the lower or movable piston 98.

The upper end of the ram cylinder 54 is closed by a removable cover 150 through which piston rod 140 passes, and cover 150 is provided with an inlet 152 through which air may be admitted to the space within cylinder 54 above the fixed piston 96.

The movable piston 98 is provided with a piston rod 160 which passes through an aperture provided therefor in the base 162 of the cylinder well 149 provided in the ram cylinder 54. Piston rod 160 also slidably passes through an extended neck 164 which is integral with and projects downwardly from the cylinder base 162. A portion of the length of piston rod 160 is threaded as indicated at 166, and this threaded portion adjustably receives a motion limiting head 168. Head 168 is of generally U shape, having upper and lower legs 170 and 172 respectively which are provided with clearance openings 174 and 176 through which the piston rod 160 may be freely passed. The upper leg 170 is provided with an upstanding boss 178 which, under the conditions hereinafter specified, is disposed to abut against the under side of the previously-mentioned neck 164 to limit motion of ram cylinder 54 relative to piston 98. In order to effect a vertical adjustment of head 168 relative to the piston rod 160, head 168 is provided with an internally threaded worm wheel 180, the internal threads whereof mate with the threads 166 on the piston rod 160, and the upper and lower faces whereof have bearing engagement with the corresponding inwardly presenting faces on the legs 170 and 172. The peripheral teeth on worm wheel 180 continuously mesh with a worm gear 182 which is keyed to a shaft 184 which has bearing support in bearings 186 and 188 provided therefor in the head 168, the bight portion of head 168 being bifurcated to receive the worm gear 182, as most clearly appears in Fig. 7. Shaft 184 extends through a vertically extending slot 190 provided in the lower portion of the ram cylinder 54 and also passes through a corresponding vertically extending slot 192 provided therefor in the inner housing section 72. The end of shaft 184, which projects outwardly through the horn 26, is provided with an operating handle 194.

It will be noticed that head 168 is guided on the piston rod 160 by virtue of the guiding relation between the latter and the previously mentioned openings 174 and 176. Additional guiding support for head 168 is afforded by the continuous bearing engagement between the outer end 200 and 202 of previously mentioned bearing bosses 188 and 186 and corresponding bearing surfaces 204 and 206 provided on the inner faces of the two spaced legs of the lower portion 92 of the ram cylinder 54.

With the above described relation it will be understood that by rotating operating handle 194, shaft 184 and head 168 may be caused to move upwardly or downwardly along the piston rod 160. Parts are shown in Figs. 4 and 10 with head 168 turned upwardly relative to piston rod 160 to a point at which boss 178 abuts the under side of the previously mentioned neck 164, and piston 98 seats against the base 162 of the cylinder well 149 in the ram cylinder 54. Under these conditions, as will be appreciated, piston 98 and ram cylinder 54 are fixed in position relative to each other and continuously move as a unit. Under these conditions also piston 96 establishes an upper limit to the movement of the assembly comprising ram cylinder 54 and piston 98. A corresponding limit to a downward movement of the assembly comprising ram cylinder 54 and piston 98 relative to piston 96 is afforded by the engagement between the cover 150 and the upper surface of piston 96. In practice, of course, such limit is not reached, because prior to the attainment thereof, the upper electrode 36 engages the work W (Fig. 1).

In further accordance with the invention the base 162 of the cylinder well 149 is provided with an air passage 163 which opens into the cylinder well 149 beneath the piston 98, and to which a suitable flexible air supply line 165 may be connected.

The lines 148, 153, and 165 which, as described above, lead respectively to the chambered space above the fixed piston 98 to chambers spaced between the pistons 96 and 98 and to the chambers spaced beneath the piston 98 may be controlled in any of a variety of ways and may lead to any of a variety of different sources of air arranged to supply air at different pressures suited to the hereinafter-described operating cycle. An illustrative control arrangement is diagrammatically shown in Fig. 10, in which lines 148, 153, and 165 lead through the usual electrically-operated three-way control valves 210, 212, and 214 and corresponding pressure-regulating valves 216, 218, and 220 to a manifold 222 which in turn may be continuously connected to a tank 224 or other source of compressed air at a pressure in excess of the pressures for which the regulating valves are set. Any suitable means (not shown) may be used to maintain the tank 224 in a continuously charged condition and at a desired pressure.

In the preferred practice of the present invention, the ram cylinder 54 is normally retained in a position in which the movable electrode 36 is spaced away from the work W by maintaining a pressure within the portion of the cylinder well 149 above the piston 96 and by maintaining the space between the two pistons 96 and 98 normally vented to atmosphere. Under these conditions, ram cylinder 54 is urged upwardly to a position in which pistons 96 and 98 abut each other, as shown in Fig. 13. With the parts arranged as in Figs. 4 and 13, in which piston 98 is seated against the bottom 162 of the cylinder well 149 in cylinder 54, the normal position of the movable electrode 36 is the fully retracted position thereof, which is the position shown in Fig. 1.

To provide the aforementioned operation, valve 212 may be of a normally open, three-way type, which, in the de-energized position, connects line 153 to the manifold 222. In the opposite or energized position, valve 212 vents line 153 to atmosphere. On the other hand, valve 210 may be a usual three-way, normally closed type which in normal or de-energized position vents line 148 to atmosphere. In the open or energized position valve 210 closes off its vent connection and connects line 148 to the manifold 222. Valves 210 and 212 are illustrated as being controlled by a switch 230 which may be closed at the beginning of each welding operation and be caused to open at the end of each welding operation in response, for example, to an automatic sequence initiated by operating the usual foot switch F (Fig. 1).

Considering the operation of the machine with the full stroke adjustment of Figs. 1 and 10, it will be appreciated that the aforementioned pressure in the space above piston 96 normally maintains the ram cylinder 54 in its uppermost position, in which electrode 36 is spaced from the work W by a maximum amount. To make a weld, the foot switch F may be closed, which initiates an automatic and usual series of control operations, which operations include, at the beginning of the weld, an automatic closure of the switch 230 and at the end of the weld an automatic reopening of the latter. Closure of switch 230 energizes the windings of valves 210 and 212 causing these valves to reverse their position. This action results in venting the chamber space above piston 96 and in introducing air at a pressure suitable for welding purposes into the chamber space between pistons 96 and 98. The latter action drives ram cylinder 54 and piston 98 downwardly, bringing the electrode 36 into engagement with the work at the desired welding pressure. The softening of the work resulting from the heating thereof, may be expected to enable the welding pressure to depress the welding points 36 and 38 into the work by a slight amount, which depressing movement involves a further downward movement of the ram cylinder 54. This take-up movement is readily and promptly effected by virtue of the extremely low friction supporting connection between the ram cylinder 54 and its housing sections 70—72.

At the conclusion of the welding operation the reopening of switch 230 de-energizes the windings of valves 210 and 212, in response to which action the space between pistons 96 and 98 is vented to atmosphere, and a pressure suited for retracting purposes is introduced into the chamber space above piston 96. The latter pressure forces ram cylinder 54 and piston 98 to move upwardly as a unit, separating electrode 36 from the work and returning it to the fully retracted position indicated in Fig. 1.

It will be appreciated that in many welding operations a succession of welds is required to be made on the same workpiece, and that a full retracting stroke is needed only when inserting such a workpiece into the machine or removing it therefrom. In adjusting the workpiece from one welding position to the next welding position, a very short or at least a considerably shorter retracting stroke is preferred. The shortened retracting stroke is afforded in the practice of the present invention by inserting the workpiece in the machine between the electrodes 36 and 38 and introducing air at a suitable pressure, preferably in excess of the pressure utilized in lines 148 and 153, into the chamber space below piston 98. The just-mentioned chamber space may be charged, in accordance with the diagrammatic showing in Fig. 10, by opening the normally closed three-way valve 214, to thereby connect line 165 to the manifold 222. Valve 214 may be controlled in any suitable way, as by the manually operable switch 232, which may be located, for example, on the front of the head 28 for convenient access by the operator at the beginning and end of each succession of welding operations on a particular workpiece. It will be appreciated that by introducing air into the chamber space beneath piston 98 at a pressure which is superior to the normally existing pressure above piston 96, ram cylinder 54 is caused to move downwardly relatively to both pistons 96 and 98 until such a time as the neck 164 abuts the adjusting head 168. As long as these pressure relationships exist, the neck 164 will be maintained against the head 168. To adjust the upper limit of the working stroke, the previously identified handle 194 is now turned to cause the head 168 to travel along the piston rod. If the electrode at the start of the adjusting operation happens to be in engagement with the work W, the head 168 must be moved by rotation of handle 194 toward and into engagement with the neck 164 and thereafter until the electrode has been moved away from the work the same distance as it is desired to have it spaced during the interval between any two consecutive welds for convenient shifting of the work from one weld location to the next weld location. This setting defines the upper limit of the working stroke. If the electrode at the start happens to be too far above the work W, the handle 194 is rotated in a direction opposite to that required above to move the head 168 downwardly relative to the piston rod 160 until the electrode 36 reaches the desired position as explained hereinbefore. It is to be understood that in this last-mentioned instance the head 168 will not move longitudinally relative to the neck 164, and, in effect, the rod 160 will move upwardly until the electrode reaches the desired position as hereinbefore described (see Fig. 11). A new and substantially fixed relationship between piston 98 and ram cylinder 54 is now established, in which new position the normal spacing between the upper and lower electrodes 36 and 38 is reduced by the amount to which adjusting head 168 was moved relative to piston 98. If, under the just-mentioned conditions, a welding operation is initiated by closing switch 230, the space above piston 96 is again vented, and the space between the two pistons 96 and 98 is again charged, thereby causing the electrodes to clamp the work between them. At the conclusion of the welding operation again the space between the pistons 96 and 98 is vented, and the space above piston 96 is charged, causing cylinder 54 and ram 98 to move upwardly to the position shown in Fig. 11, in which the pistons 96 and 98 are again in engagement with each other.

At the conclusion of the succession of welds on the particular workpiece W in question, switch 232 may be opened, thereby venting the chamber space beneath piston 98. This action enables the pressure in the chamber space above piston 98 to force ram cylinder 54 upwardly until piston 98 bottoms against the base 162, which position of the parts is shown in Fig. 13. If a series of identical workpieces W are to be welded the new piece W may be inserted, the switch 232 closed, and the welding started, using the same adjustment of the handle 149. The closure of switch 232 charges the chamber space beneath piston 98 and forces cylinder 54 downwardly with respect thereto until these parts reach the relative position shown in Fig. 11.

It will now be obvious that with my construction I have a rugged, easily operated, and easily and economically manufactured structure which has a wide open stroke or position of the electrodes for easy insertion and removal of the workpiece and a shorter or lesser work stroke for performing a series of welding operations on one unit to be welded, which, by eliminating the time required to part the electrodes, the unnecessary distance reduces the welding time and increases the output of the machine without rendering it a single-purpose machine or undesirable for use for single welds; and that my construction, with its extremely easily moved ram, provides for uniform welds to be made because the electrodes are enabled to exert an actual welding pressure on the spot being welded which is substantially equal to the "static" pressure of the machine.

Although only a specific embodiment of the invention has been described in detail, it will be appreciated that various modifications in the form, number, and arrangement of parts may be made without departing from the spirit and scope of the invention.

What is claimed and desired to be secured by United States Letters Patent is as follows:

1. In a welding ram, a support, a first member adapted to carry a welding electrode and having a chamber defining a cylinder with a first end wall and a second end wall, a first piston in said cylinder adjacent said first end wall and cooperable therewith to form a first pressure chamber, a second piston in said cylinder adjacent said second end wall and cooperable therewith to form a second pressure chamber, said second piston being engageable with said first piston for limiting movement of said first member in one direction, said first end wall having an aperture therethrough, a first supporting member carried rigid with said support and extending through said aperture with an end portion within said cylinder, said first piston being secured to said end portion, means for supplying fluid pressure to said first pressure chamber for moving said member in said one direction, and means for supplying fluid pressure to said second pressure chamber for moving said second piston toward said first piston, and means limiting movement of said second piston by the fluid pressure admitted to said second pressure chamber whereby the movement of said member in said one direction is limited.

2. In a welding ram, a support, a first member having a chamber defining a cylinder having a first end wall and a second end wall, a first piston in said cylinder adjacent said first end wall, a second piston in said cylinder adjacent said second end wall and engageable with said first piston, said end walls having apertures therethrough, a first supporting member carried rigidly by said support and extending through said first end wall aperture with an end portion within said cylinder, said first piston being secured to said end portion, a piston rod having one end portion secured to said second piston and having a portion extending through said second end wall aperture, means carried by said last-named rod extending portion for limiting movement of said second piston in one direction whereby it is engageable by said first piston to determine the limit of movement of said member.

3. In a welding ram, a supporting structure, a member movably carried by said structure and having a chamber with end walls, means adjacent one end portion of said member adapted to carry a welding electrode, a pair of pistons in said chamber and co-operable with said end walls to provide a first and a second pressure chamber, means rigidly securing one of said pistons to said structure, and means limiting movement of the other of said pistons in a direction toward said one piston.

4. In a welding ram, a supporting structure, a member movably carried by said structure and having a chamber with end walls, means adjacent one end portion of said member adapted to carry a welding electrode, a pair of pistons in said chamber and co-operable with said end walls to provide a first and a second pressure chamber, means rigidly securing one of said pistons to said structure, the other of said pistons having a piston rod extending outwardly of said chamber, means adjustably carried on said rod and engageable with said member for limiting movement of said other piston toward said one piston, and means for controlling the adjusted position of said carried means.

5. In a welding ram, a supporting structure, a member movably carried by said structure and having a chamber with end walls, means adjacent one end portion of said member adapted to carry a welding electrode, a pair of pistons in said chamber and co-operable with said end walls to provide a first and a second pressure chamber, means rigidly securing one of said pistons to said structure, the other of said pistons having a piston rod extending outwardly of said chamber in a direction toward said one end portion, means adjustably carried on said rod and engageable with said member for limiting movement of said other piston toward said one piston, and means positioned intermediate said one end portion and said chamber for controlling the adjusted position of said carried means.

6. In a ram for controlling the position of a movable welding electrode relative to a workpiece, an elongated member having a chamber with upper and lower end walls and means whereby the electrode may be carried in fixed relation thereto, a pair of pistons in said chamber and co-operable therewith to provide upper and lower pressure chambers, a first piston rod extending in sliding sealed relationship through said upper wall and secured adjacent its lower end portion to the one of said pistons co-operable with said upper pressure chamber, a portion of said rod externally of said upper wall being adapted to be secured to a support for receiving the reaction force of the electrode, a second piston rod extending in sliding sealed relationship through said lower wall and secured adjacent one end portion to the other of said pistons which is co-operable with said lower pressure chamber, an abutment arranged in fixed space relation to said lower wall, means adjustably carried by said second rod externally of said lower wall engageable with said abutment to limit movement of said other pistons toward said upper end wall, and means whereby fluid may be supplied to said pressure chambers.

7. The combination of claim 6 in which said abutment is spaced from said lower wall and is joined thereto by a guide portion in which said second rod is guided for reciprocal movement.

8. The combination of claim 6 in which a supporting structure adapted to support a fixed electrode supports said elongated member for reciprocal movement and said external portion of said first rod is secured to said structure.

JOHN D. GORDON.

REFERENCES CITED

The following references are of record in the file of this patent:

UNITED STATES PATENTS

| Number | Name | Date |
| --- | --- | --- |
| 2,293,393 | Humphrey | Aug. 18, 1942 |
| 2,312,938 | Stieglitz | Mar. 2, 1943 |
| 2,313,941 | Humphrey | Mar. 16, 1943 |
| 2,331,537 | Clark | Oct. 12, 1943 |
| 2,337,022 | Beiderman | Dec. 21, 1943 |
| 2,365,148 | Clark | Dec. 12, 1944 |